United States Patent [19]

Soma et al.

[11] Patent Number: 5,708,508
[45] Date of Patent: Jan. 13, 1998

[54] IMAGE RECORDING APPARATUS WITH ONE-SIDE AND TWO-SIDE COPYING MODES

[75] Inventors: Utami Soma; Jun Yokobori; Susumu Kurihara, all of Tokyo, Japan

[73] Assignee: Konica Corporation, Tokyo, Japan

[21] Appl. No.: 345,134

[22] Filed: Nov. 28, 1994

[30] Foreign Application Priority Data

Dec. 1, 1993 [JP] Japan .................................. 5-301943

[51] Int. Cl.[6] .................................................. G03G 21/00
[52] U.S. Cl. .................................... 358/296; 399/374
[58] Field of Search ................................. 358/296, 444, 358/468; 355/308, 313, 319; 395/115

[56] References Cited

U.S. PATENT DOCUMENTS

| | | | |
|---|---|---|---|
| 4,910,612 | 3/1990 | Yamazaki | 358/496 |
| 5,095,371 | 3/1992 | Tanaka et al. | 358/300 |
| 5,206,684 | 4/1993 | Wada et al. | 355/203 |
| 5,243,439 | 9/1993 | Jacobus et al. | 358/448 |
| 5,491,557 | 2/1996 | Nakajima et al. | 358/296 |
| 5,528,361 | 6/1996 | Sakata | 358/296 |

*Primary Examiner*—Peter S. Wong
*Assistant Examiner*—Gregory J. Toatley, Jr.
*Attorney, Agent, or Firm*—Frishauf, Holtz, Goodman, Langer & Chick

[57] ABSTRACT

An image recording apparatus, such as a copying machine and a printer. The image recording apparatus includes: a reading section for scanning an image on a document and generating image signals corresponding to the image; a memory for storing the image signals; an image formation processing section for forming an image on a transfer sheet according to the image signals; a sheet feeding section for holding the transfer sheet and feeding the transfer sheet to the image formation processing section; a sheet discharging section for discharging the transfer sheet outside the image recording apparatus; and a setting section for selecting one of a one-side copying mode, when only an image on one-side of the document is formed on one-side of the transfer sheet, and a two-side copying mode, when images on both sides of the document are formed on respective sides of the transfer sheet. An overall control section controls the image recording apparatus so as to (i) form an image on the transfer sheet according to the image signals obtained from the reading section when one-side copying mode is selected; and (ii) form an image on the transfer sheet according to the image signals, which are once stored in the memory and then obtained from the memory, when a two-side copying mode is selected.

13 Claims, 6 Drawing Sheets

IMAGE RECORDING APPARATUS WITH ONE-SIDE AND TWO-SIDE COPYING MODES

BACKGROUND OF THE INVENTION

The present invention relates to an image recording apparatus having an automatic document feeder and a two-side copying mechanism capable of recording document information on one side or two sides of a recording sheet, and more particularly relates to an image recording apparatus in which document information is controlled and processed after it has been converted into an image signal.

FIG. 6 is a block diagram showing a system of image data control conducted in the conventional image recording apparatus. The image recording apparatus includes an image recording apparatus body 60 to which an automatic document feeding section 61 is attached. This image recording apparatus is controlled by an overall control section 64, and the printing operation is carried out as follows. In accordance with the copying mode that has been set by a setting section 63, document image data that has been read by a reading section 65 is sent to an image processing section 66. In the image processing section 66, the image data is changed into a laser beam. Then the laser beam passes through a laser optical system 67. In accordance with the laser beam, an image is formed in an image processing section 68, and the formed image is printed out.

The image processing section 66 includes a storage means (memory) used for image processing or image compiling. For example, a memory of the page unit is used in the storage means. It is possible to connect an external device 62 (for example, a computer) including a memory 62a to the image recording apparatus body 60. Accordingly, image data, from the external device 62, is read out page by page in the sequence of page number by the control section; and the image data is sent from the memory 62a through the interface shown in FIG. 6 to the image processing section 66 of the apparatus body 60. Image data passes through the laser optical system 67, and an image is formed in the image formation processing section 68. After that, the formed image is printed out.

The conventional image output apparatus described above has a memory means capable of accommodating image information at the page unit. Accordingly, in the conventional image output apparatus, image information is temporarily accommodated in the memory and then outputted.

However, in the conventional apparatus, the memory means is not used for enhancing the productivity, maneuverability and reliability of the recording apparatus. Therefore, the function of the apparatus is not sufficiently exhibited.

It is an object of the present invention to provide an image recording apparatus capable of storing image information at the page unit, characterized in that the high productivity and reliability can be ensured when the memory means is most appropriately controlled with respect to the setting condition of the recording apparatus and the connecting condition with the external device.

Another object of the present invention is to enhance the productivity of image formation in the case of a two-side copying mode in which a complicated transfer sheet control operation is required and also to enhance the productivity in the case of a one-side copying mode so that the image formation can be made at the real time.

Still another object of the present invention is to enhance the reliability of a two-side copying apparatus without employing a stack type two-side copying apparatus. In this case, the stack type two-side copying apparatus is defined as a copying apparatus in which one-side copied transfer sheets are temporarily accommodated in a stack and then the other sides of the transfer sheets are subjected to the copying operation.

Still another object of the present invention is to provide a copying apparatus having an automatic document feeding device in which it is not necessary to repeatedly convey the documents, so that the document feeding reliability can be enhanced.

When one-side documents, the number of which is odd, are subjected to the two-side copying operation, it is necessary to input the number of the documents for the purpose of collation from the necessity of forming an image on the first page. In order to input the number of documents, the following systems are conventionally provided. One is a system in which the documents are fed before the copying operation for the purpose of counting the number of documents, and then the documents are fed again so as to read and output the image. The other is a system in which the number of documents are directly inputted by an operator so as to read and output the image. Still another object of the present invention is to provide a copying apparatus of high productivity in which the number of documents can be realized simultaneously when the documents are read so that the reading operation is not required in the later process and time can be saved.

SUMMARY OF THE INVENTION

The above objects can be accomplished by an image recording apparatus constructed in the following manner: When a one-side copying operation mode is selected in which an image is formed on one side of a sheet and then the sheet is discharged, image formation is made in accordance with the data obtained in the process of document scanning. When a two-side copying operation mode is selected in which images are formed on both sides of a sheet, image formation is made in accordance with the data read out from the memory in which all document image data is stored.

When the image recording apparatus of the present invention receives image information from an external device, data can be received even while the recording apparatus is carrying out another image output process. Therefore, the downtime can be greatly reduced. In a conventional compound apparatus, when the apparatus is used as a copying machine, the CPU in the copying machine is operated as a main CPU, and when the apparatus is used as a printer, the CPU in the print controller is operated so as to be used as a main CPU. In this way, the controlling operation is very complicated. According to the present invention, the aforementioned complicated controlling operation is not required, and the CPU installed in the copying machine is mainly used in any mode, so that the controlling system can be simplified.

DETAILED DESCRIPTION OF THE INVENTION

Figure 1:
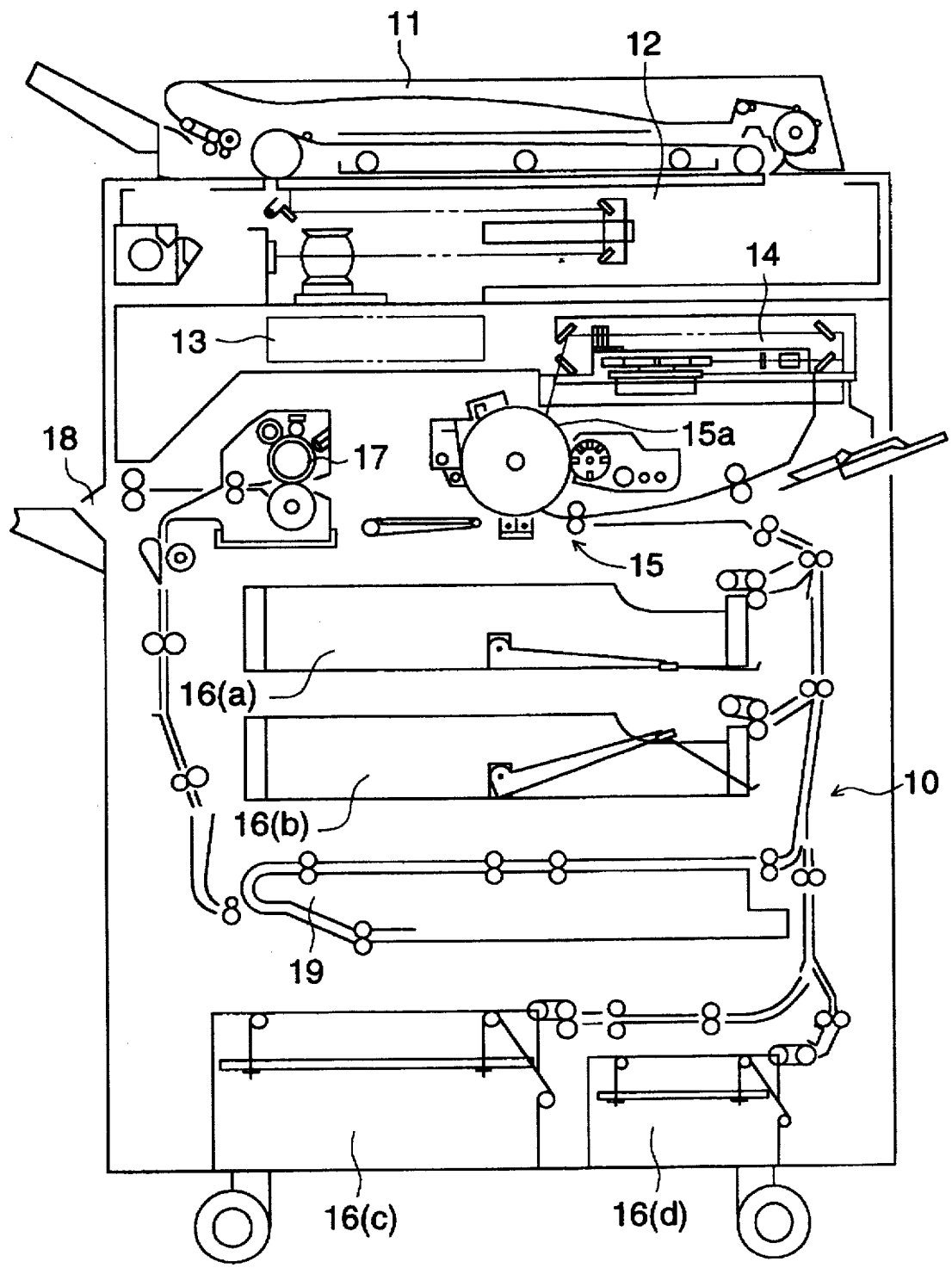
FIG. 1 is an overall arrangement view showing the example of the present invention.

FIG. 1 is an overall arrangement view showing the example of the present invention. There is provided an automatic document feeding section 11 on an upper surface of the image recording apparatus 10. By the action of the automatic document feeding section 11, both sides of a document can be reversed and automatically fed onto a platen glass. Numeral 12 is a reading section. In the reading section 12, image information of a document placed on the platen glass is read out by a photoreceptor such as a CCD and outputted in the form of an image signal. Numeral 13 is an image processing section. In the image processing section 13, an image signal outputted from the reading section 12 is processed and converted into a recording signal suitable for the laser beam recording. Numeral 14 is a laser optical system which emits a beam of light in accordance with the recording signal. The laser optical system 14 conducts optical scanning operation on a rotating photoreceptor drum 15a so that a latent image can be formed. The latent image on the photoreceptor drum 15a is developed by the image formation processing section 15 including a charger and a developing unit provided around the periphery of the photoreceptor drum 15a. In this way, the latent image is changed to a toner image. The toner image is transferred onto a transfer sheet which is discharged from one of the sheet feed sections 16(a), 16(b), 16(c) and 16(d) and fed synchronously with the rotation of the photoreceptor drum 15a. The transfer sheet onto which the toner image has been transferred is sent to a fixing unit 17 so that the toner image is fixed. In the one-side operation mode, the transfer sheet is discharged outside from a sheet discharge section 18. Although not shown in the drawing, the sheet discharge section 18 is provided with a finisher capable of finishing operation such as stapling. Therefore, a plurality of discharged transfer sheets are stapled. Also, a setting means (not shown in the drawing) for setting the number of copied volumes is provided.

In the two-side copying mode, after an image on one side of a transfer sheet has been fixed by the fixing unit 17, the transfer sheet is conveyed to a two-side copying apparatus 19. After the transfer sheet has been reversed, the toner image is transferred onto a reverse side of the transfer sheet in the image formation processing section 15. In this connection, a selection is made between the one-side and two-side copying modes by a selecting section not shown in the drawing or by a direction sent from the outside of the copying apparatus. The two-side copying apparatus 19 of this example is different from a conventional system in which one-side copied transfer sheets are accumulated in the stack and discharged. In the two-side copying apparatus 19 of this example, one-side copied transfer sheets are not stacked but immediately fed to the image formation processing section 15. That is, the two-side copying apparatus 19 of this example is a non-stack type two-side copying apparatus. In the non-stack type two-side copying apparatus, a loss of operation caused by the stack portion can be avoided. In the stack system, transfer sheets are temporarily accommodated in the stack. Therefore, the transfer sheets are maintained under the condition that they are not nipped by any rollers. Accordingly, the one-side copied transfer sheets are necessarily curled immediately after the fixing process, so that the problems of jam and double feeding are frequently caused. However, in the non-stack system, transfer sheets are nipped by rollers at all times. Accordingly, the reliability of feeding of transfer sheets can be greatly enhanced.

Figure 3:
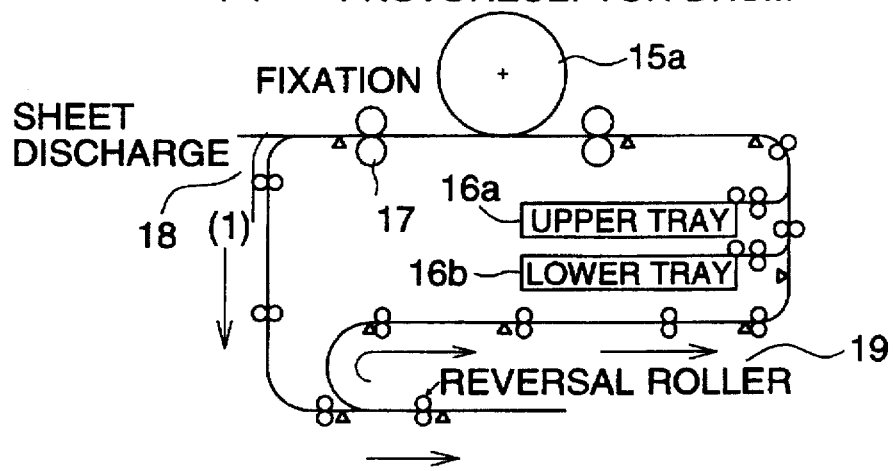
FIGS. 3(a) to 3(c) are schematic illustrations showing the operation of the two-side copying apparatus of the nonstack system.
Figure 3:
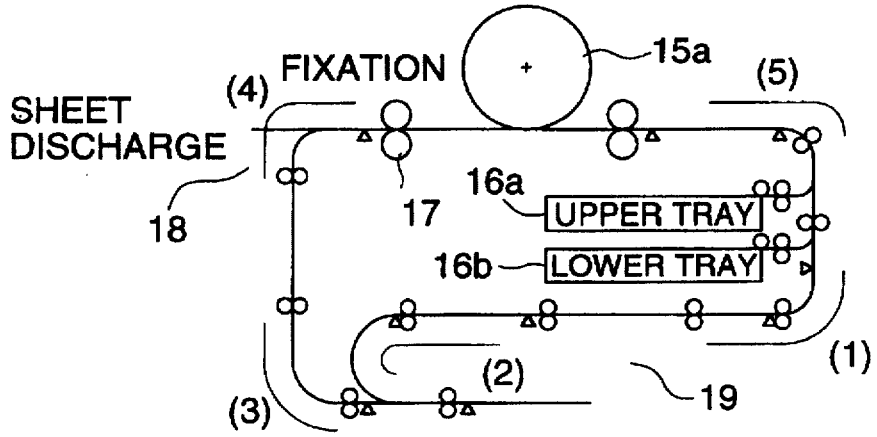
Figure 3:
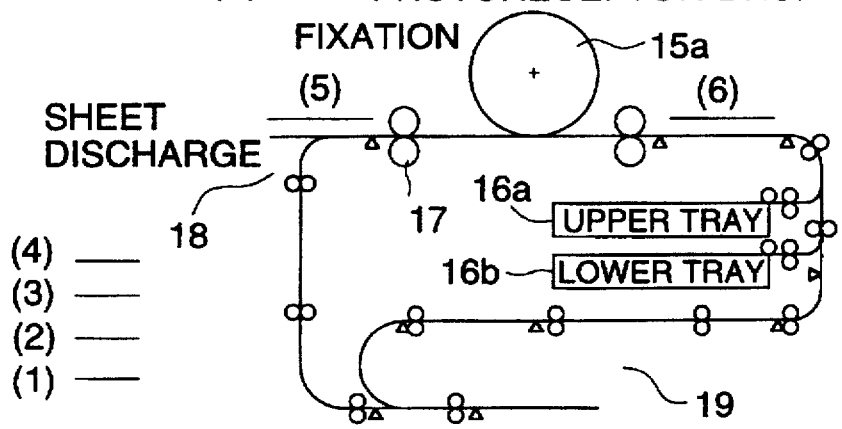

FIGS. 3(a), 3(b) and 3(c) are schematic illustrations for explaining the operation of the two-side copying apparatus of the non-stack system. Sheet feeding conditions are shown in the drawings. As illustrated in FIG. 3(a), one-side copied transfer sheets are conveyed in the direction of the arrows, and images are formed on the reverse side. To be more specific, as shown in FIG. 3(b), the one-side copied transfer sheets (1), (2), (3), (4) and (5) are successively sent into the conveyance path. After that, as shown in FIG. 3(c) the transfer sheet (6) is sent into the conveyance path. The reason why the transfer sheet (6) is sent into the conveyance path after the transfer sheets (1), (2), (3), (4) and (5) is that 5 transfer sheets of the size of A4 can be provided in the conveyance path in this example. For example, when 12 sheets of documents are subjected to the two-side copying operation, after the front sides of pages 12, 10, 8, 6 and 4 have been copied with respect to 5 transfer sheets, the reverse sides of pages 11, 9, 7, 5 and 3 are copied. After that, the sixth transfer sheet (6) is sent, and the front side of page 2 and the reverse side of page 1 are copied. In this connection, when the document of an odd page, for example, the document of page 5, which is a one-side document, is subjected to the two-side copying operation, first, one transfer sheet on which an image is not formed is sent to the reversal conveyance path. After that, image data is read out from the memory in accordance with the following timed relation. That is, the pages 4 and 2 are copied, and then the pages 5, 3 and 1 are copied. The above operation can be performed when the page number of a document is discriminated in the case of storing the document image in the memory.

Figure 2:
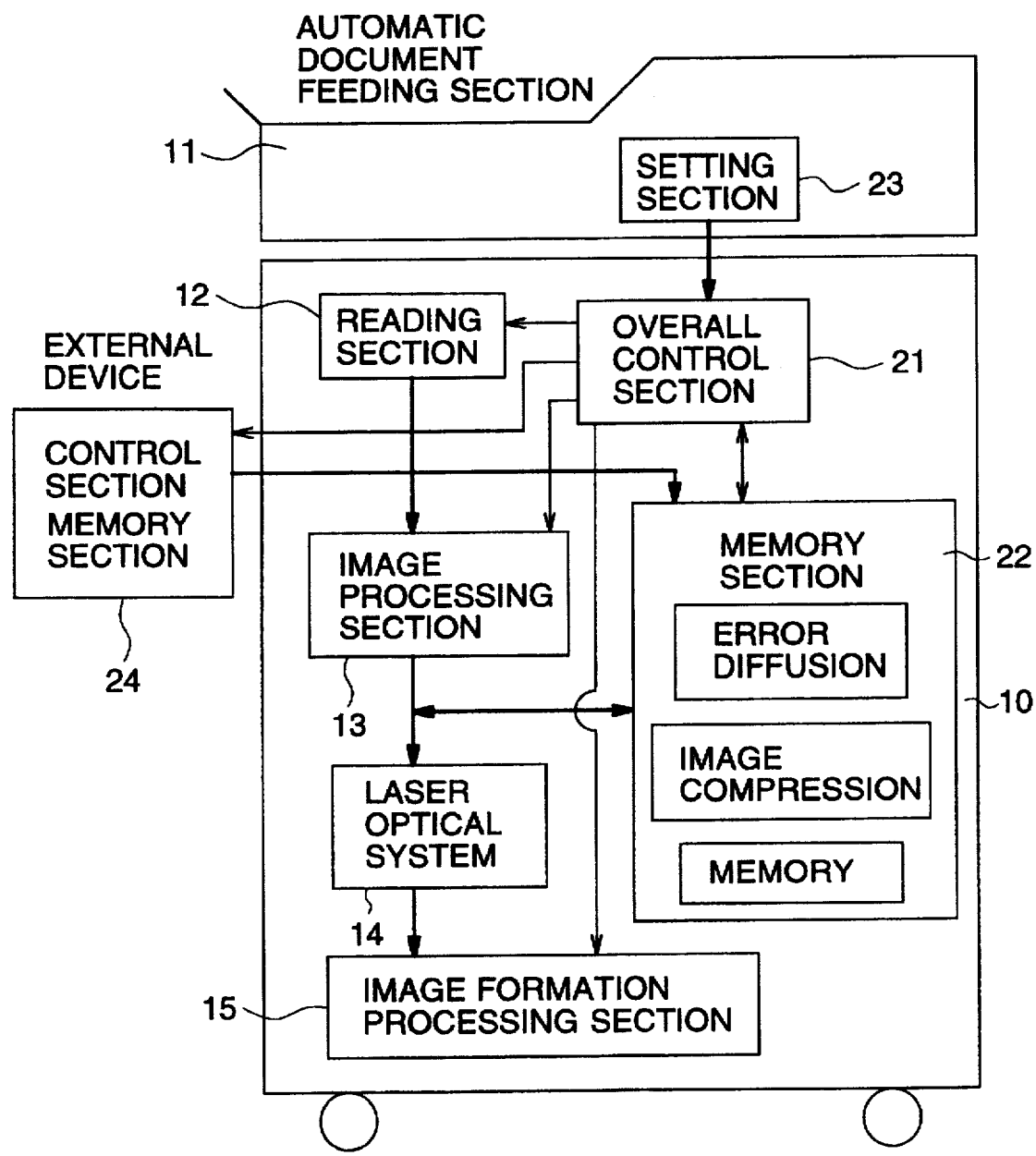
FIG. 2 is a block diagram showing the control system of the image recording apparatus of the present invention.

FIG. 2 is a block diagram showing the control system of the image recording apparatus of the present invention. An overall control section 21 is provided in the apparatus body 10, and the entire apparatus is controlled by the overall control section 21. In apparatus body 10, there is provided a memory section 22 having a large capacity of memory capable of accommodating a large amount of image information corresponding to several tens pages. Due to the above construction, image information that has been read out by the reading section 12 is processed by the image processing section 13. Then the processed image information is stored in the memory section 22 in the form of image data of the page unit. After that, the order of pages to be read out is determined by the overall control section 21, and image data accommodated in the memory section 22 is sent to the laser optical system 14 in accordance with the order of pages determined in the manner described above. Then the laser optical system 14 conducts the optical scanning operation on the photoreceptor drum 15a. When image data is received from the external device 24, the operation can be carried out in the same manner as described above. When the overall control section 21 appropriately conducts memory address control, even if the apparatus body 10 is engaged in the printing operation of the previous job, image data sent from the external device 24 can be received by the memory section 22. Accordingly, immediately after the previous job has been completed, image data sent from the external device 24 can be called from the memory section 22 so as to start the printing operation.

Figure 4:
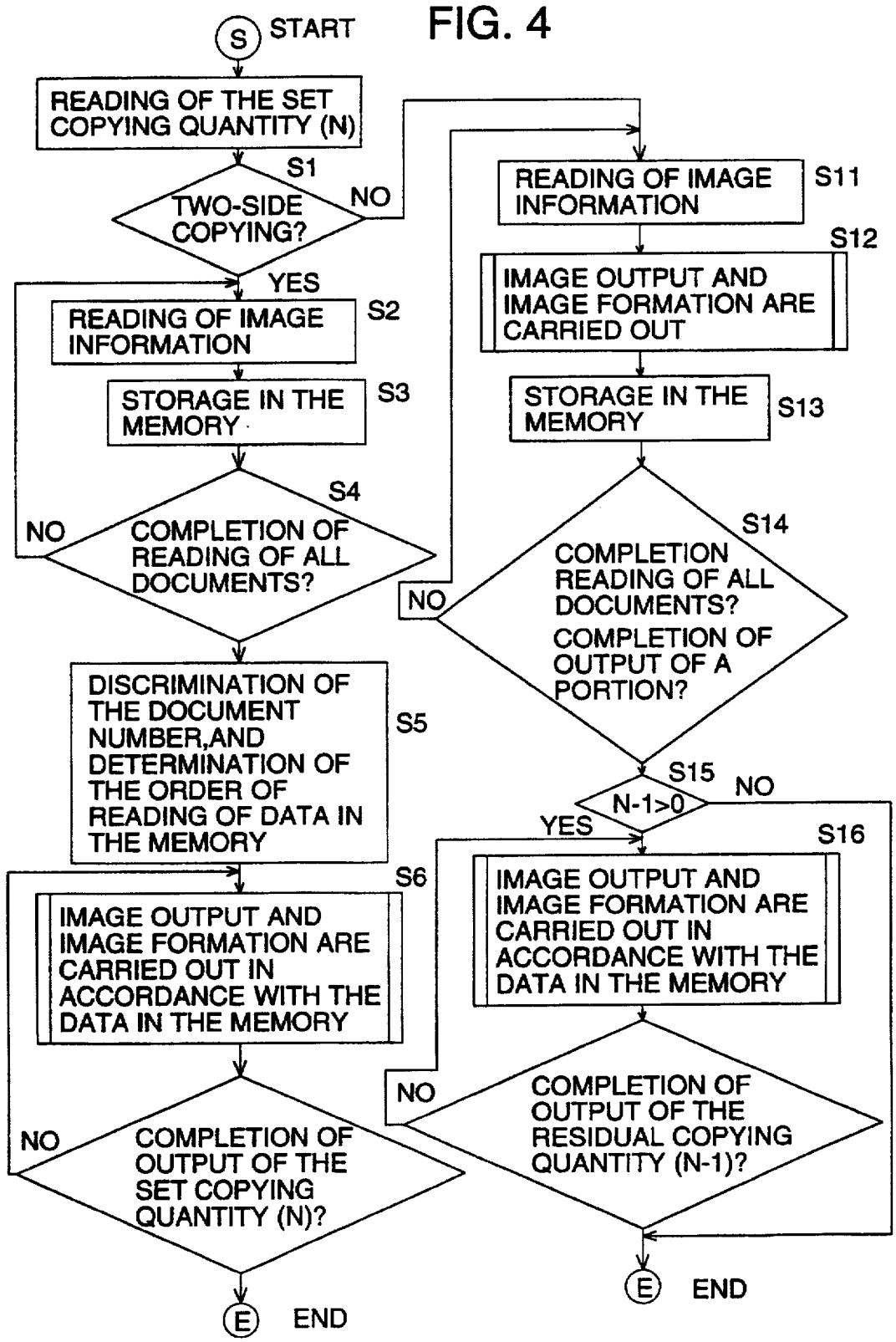
FIG. 4 is a flow chart showing the control of the apparatus the present invention.

FIG. 4 is a flow chart showing the controlling operation of the above apparatus. The setting section 23 determines a condition such as a mode, size and the number of sheets. After the copying operation has been started, it is checked whether the printing operation is a two-side copying mode or not (S1). In the case of the two-side copying mode, image information of all documents fed by the automatic document feed section 11 is read out by the reading section 12 (S2). Then the image information is processed by the image processing section 13 and stored in the memory section 22 (S3). After image information of all documents has been read out and stored in this way (S4), the number of documents is discriminated, and the order of calling the memory for conducting a two-side copying operation is determined (S5). Then the image information stored in the memory section 22 is called in accordance with the order determined above, and outputted to the laser optical system 14. In this way, the image output process starts (S6). These operations are shown in FIGS. 3(a), 3(b) and 3(c).

According to the image output process described in the above flow, even in the two-side copying mode in which a complicated transfer sheet controlling operation is required, since image information is necessarily stored in the memory section 22, the image information can be easily called out from the memory section 22 synchronously with a transfer sheet to be fed. Therefore, the productivity can be enhanced in the process of printing. In the non-stack system described before, only a timed relation of image output given by the memory section may be controlled with respect to the transfer sheets existing in the conveyance path. In this case, the order of document pages is 12, 10, 8, 6, 11, 9, 7, 5, 3, 2 and 1. According to this system, even in the case of occurrence of jam, countermeasures can be easily taken since the document information is stored in the memory section.

Figure 5:
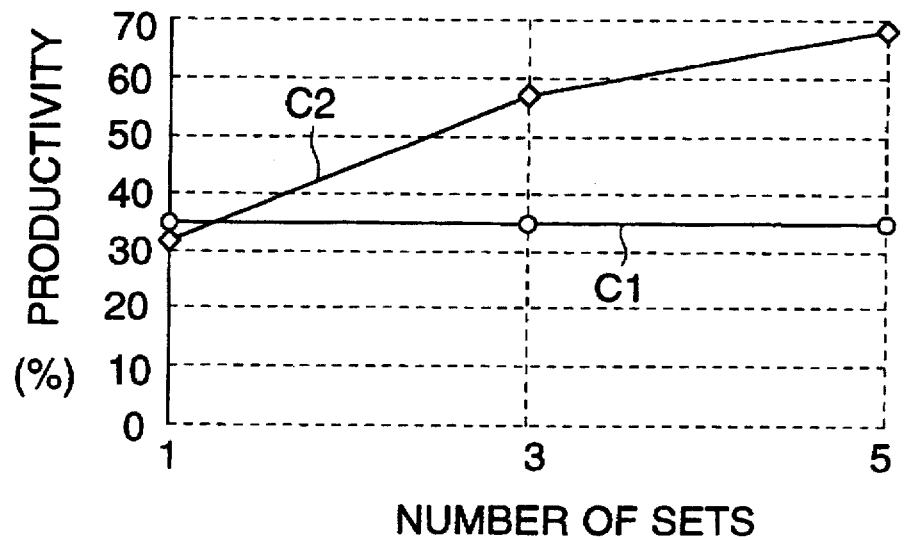
FIGS. 5(a) and 5(b) are graphs showing the productivity of the printing operation according to the present invention.
Figure 5:
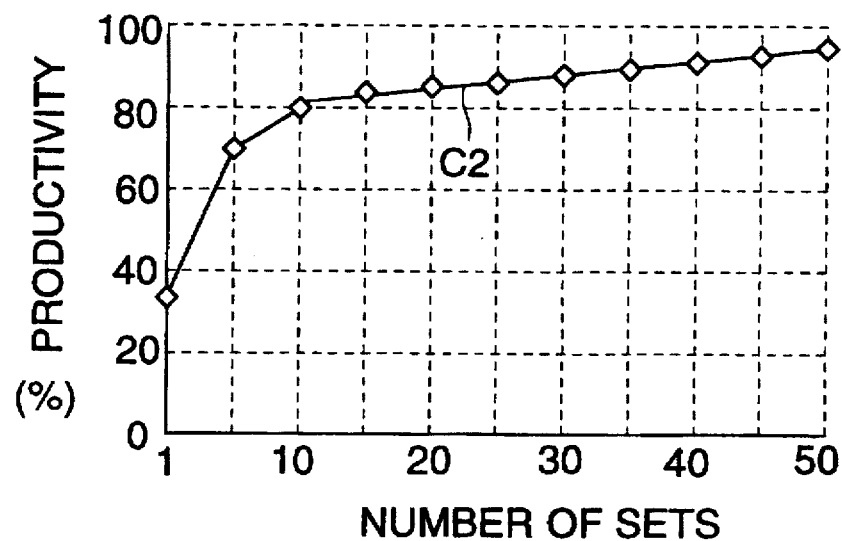

FIGS. 5(a) and 5(b) are graphs showing the productivity of the printing operation according to the present invention.

In each of FIGS. 5(a) and 5(b), the vertical axis expresses the productivity (%) which is an index defined as follows:

In an RF system, which is a mode in which the bookbinding operation is completed for each volume, when a two-side document is subjected to the two-side copying operation, the ratio of a copying speed with respect to the maximum copying speed is expressed by the index when a job is completed at the copying speed.

Also the horizontal axis expresses the number of sets. Curve C2 expresses the productivity provided when the present invention is applied. Curve C1 expresses the productivity provided by the conventional system in which an automatic document feed section 61 having no memory is used. When a comparison is made between curves C1 and C2, it is clear that the effect is enhanced in the case of curve C1 of the present invention as the number of sets is increased.

On the other hand, when the mode is not a two-side copying mode in step 1 (S1), that is, when the mode is a one-side copying mode, image information of all documents is read (S11) and successively outputted and stored (S12). Therefore, the image is recorded at the real time. At the same time, the image information is stored in the memory section 22 (S13). After all documents have been read and the image information has been stored in the memory (S14), when a predetermined number of volumes have not been copied (S15), the image output process is repeated using the image data stored in the memory section (S16). Therefore, it is not necessary to feed the documents again and read them, so that the operation speed can be increased and the occurrence of jam can be prevented. When a plurality of volumes are printed using the automatic document feed section 11 in the one-side copying mode, in the case of the conventional image recording apparatus, a sorter composed of a large number of sorting bins is required as a finishing system. However, according to the above example of the present invention, it is not necessary to provide such a complicated finishing system as a sorter.

Figure 6:
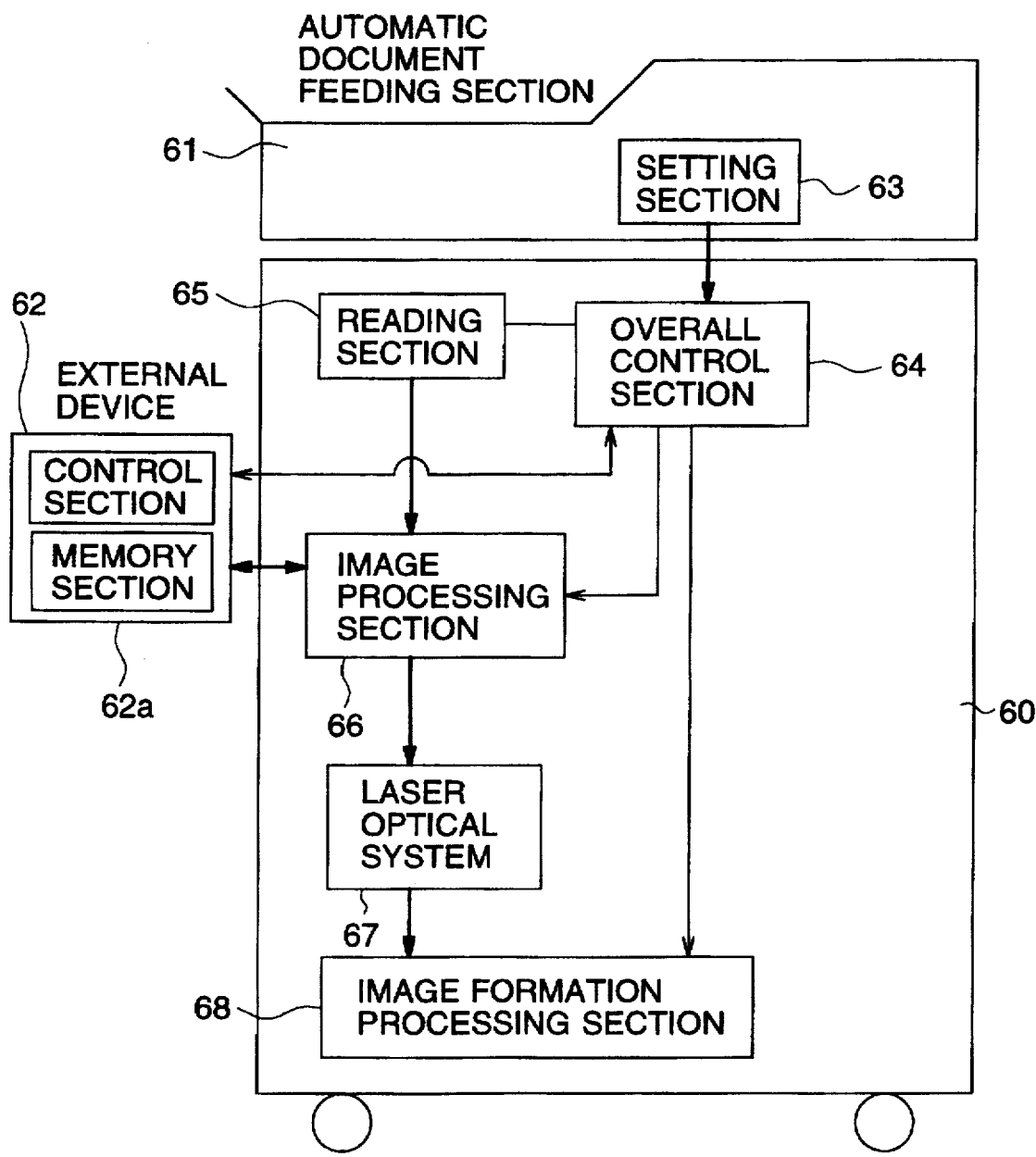
FIG. 6 is a block diagram showing the control system of the conventional image recording apparatus.

As illustrated in FIG. 2, when image data is received from the external device 24 ( as same as the external device 62 in FIG. 6) and outputted as image information, all image information sent from the external device 24 is stored in the memory section 22 and then outputted for carrying out an image formation process. Due to the above controlling operation, even while the image recording apparatus is carrying out the image output process, it is possible to receive another data. It is possible to output the image data from the last page using the data stored in the memory section. In this way, copied sheets can be easily collated. For example, when image data of page 5 is recorded, image data is read out by the overall control section 21 from the memory in the order of pages 5, 4, 3, 2 and 1. Due to the foregoing operation, recorded sheets can be collated even when they are stacked without using a sheet reversal means.

According to the present invention, it is possible to realize an image recording apparatus characterized in that the high productivity and reliability can be ensured when the memory means is most appropriately controlled with respect to the setting condition of the recording apparatus and the connecting condition with the external device.

What is claimed is:

1. An image recording apparatus, comprising:
   a reader which scans images of all of at least one document to be copied, and generates image signals corresponding to said scanned images;
   a memory which stores all of said generated image signals of all of the documents to be copied;
   an image formation processing section for forming images on transfer sheets according to said image signals;
   a sheet feeder which holds said transfer sheets and feeds said transfer sheets to said image formation processing section;
   a sheet discharging section which discharges said transfer sheets to the outside of said image recording apparatus;
   a setting section for selecting one of (i) a one-side copying mode, when only one-side of said at least one document to be copied is subjected to be copied onto said transfer sheets, and (ii) two-side copying mode, when two-sides of each of said at least one document to be copied is subjected to be copied onto said transfer sheets; and
   an overall control section which controls said image recording apparatus so as to form images on said transfer sheets according to said image signals obtained from said reader without using said image signals which are stored in said memory when a one-side copying mode is selected; and which controls said image recording apparatus so as to first store said image signals of all of the documents to be copied in said memory and to then form images on said transfer sheets according to said stored image signals, wherein said image signals are first once stored in said memory and then obtained from said memory only when said two-side copying mode is selected.

2. The image recording apparatus of claim 1, wherein:
   said setting section includes a number setting device for inputting a number of copies to be made from at least one document to be copied; and said overall control section further controls said image recording apparatus so as to form an image of said at least one document according to said image signals obtained from said reader without using the image signals which are stored in said memory for a first number of transfer sheets, and to form images of said at least one document to be copied according to said image signals obtained from said memory for a second and further number of transfer sheets when said one-side copying mode is selected by said setting section and said inputted number of copies, inputted by said number setting device, is more than one.

3. The image recording apparatus of claim 1, further comprising:
   a conveyance path section which defines a conveyance path for conveying the image formed transfer sheets from said image formation processing section to said sheet feeder; and
   wherein said sheet feeder and said conveyance path section together form a sheet reversing path for reversing said transfer sheets when the two-side copying mode is selected; and
   said sheet reversing path holds said transfer sheets when plural copies of said at least one document are set by said number setting device.

4. The image recording apparatus of claim 3, wherein said overall control section further controls said reading from said memory in synchronism with a conveying operation of said plurality of transfer sheets by said sheet feeder.

5. The image recording apparatus of claim 4, wherein said overall control section controls said memory according to a number of said transfer sheets standing by in said sheet reversing path.

6. The image recording apparatus of claim 5, wherein said overall control section further controls said image recording apparatus so as to:
   repeat forming of an image of a first side of said at least one document according to image signals obtained from said memory in accordance with said number of transfer sheets standing by, and to then
   repeat forming of an image of a second side of said at least one document, which is an opposite side of said first side, according to image signals obtained from said memory in accordance with said number of transfer sheets standing by.

7. The image recording apparatus of claim 1, wherein said reader includes:
   a document feeder which feeds documents to be copied to a scanning section of said reader;
   a counter which counts a number of documents to be copied; and
   a scanner which scans said at least one document to be copied and generates said image signals corresponding to images of said at least one scanned document;
   wherein said image signals corresponding to said images are stored in said memory when each of said one-side copying mode and said two-side copying mode are individually selected by said setting section; and
   wherein said overall control section further controls a sequence of obtaining said image signals corresponding to said images from said memory in accordance with said number counted by said counter.

8. The image recording apparatus of claim 7, wherein said overall control section further controls said image recording apparatus so as to prevent forming of an image on a first one of said transfer sheets, which is conveyed to said image formation processing section, when said number counted by said counter is an odd number.

9. The image recording apparatus of claim 8, wherein said overall control section further controls said image recording apparatus so as to read said image signals from said memory in a sequence which starts with image signals corresponding to a last page.

10. The image recording apparatus of claim 1, further comprising:
    an interface unit which transfers image signals, corresponding to a plurality of images in a predetermined sequence, from an external device to said memory; and
    wherein said memory stores said image signals transferred from said interface unit.

11. The image apparatus of claim 10, wherein said overall control section controls said memory so as to obtain said image signals from said memory in a sequence which starts with image signals corresponding to a last one of said plurality of images in said predetermined sequence.

12. The image apparatus of claim 1, wherein said at least one document to be copied comprises a plurality of documents.

13. The image apparatus of claim 12, wherein said plurality of documents are two-side documents which are to be two-side copied.

* * * * *